(12) United States Patent
Li

(10) Patent No.: US 7,350,393 B2
(45) Date of Patent: Apr. 1, 2008

(54) HAND TOOL FOR WIRES

(76) Inventor: Yu Hsin Li, No. 5, Avenue 15, Lane 555, Sec. 1, Jonsan Road, Changhua 50063 (TW)

( * ) Notice: Subject to any disclaimer, the term of this patent is extended or adjusted under 35 U.S.C. 154(b) by 158 days.

(21) Appl. No.: 11/452,062

(22) Filed: Jun. 13, 2006

(65) Prior Publication Data

US 2007/0283740 A1    Dec. 13, 2007

(51) Int. Cl.
  *B21D 37/14*    (2006.01)
  *H01R 43/042*   (2006.01)
(52) U.S. Cl. .................. 72/409.16; 72/482.91; 81/423; 29/751
(58) Field of Classification Search ............ 72/409.01, 72/409.16, 413, 416, 482.91, 482.92; 81/421–423; 29/751
See application file for complete search history.

(56) References Cited

U.S. PATENT DOCUMENTS

| | | | |
|---|---|---|---|
| 2,761,339 A * | 9/1956 | Lazar et al. ............. | 72/409.16 |
| 3,947,905 A | 4/1976 | Neff ................................. | 7/5.6 |
| 4,106,195 A | 8/1978 | Berg ............................. | 30/293 |
| 4,537,099 A * | 8/1985 | Oster et al. .................... | 225/93 |
| 4,829,805 A * | 5/1989 | Koehn ...................... | 72/409.12 |
| 5,211,050 A * | 5/1993 | Gouveia et al. .......... | 72/409.16 |
| 5,913,933 A * | 6/1999 | Beetz et al. .............. | 72/409.16 |
| 6,109,088 A * | 8/2000 | Schrader et al. .......... | 72/409.16 |
| 6,477,925 B2 * | 11/2002 | Lin ............................... | 81/423 |

* cited by examiner

*Primary Examiner*—Daniel C Crane
(74) *Attorney, Agent, or Firm*—Charles E. Baxley

(57) ABSTRACT

A hand tool includes two levers pivotally coupled together at a middle portion with an axle, and each having a handle end for being held by users, and a carrier end having a channel formed between two plates, a bar is engaged into the channel and secured between the plates of each of the levers and includes a spring-biased projection, one or more supporting members and one or more tool devices may be changeably attached to the levers and include a slot for receiving the bar and a depression for receiving the spring-biased projection, and for changeably attaching the supporting members and the tool devices to the levers without additional fasteners and driving tools.

12 Claims, 2 Drawing Sheets

HAND TOOL FOR WIRES

BACKGROUND OF THE INVENTION

1. Field of the Invention

The present invention relates to a hand tool, and more particularly to a hand tool for wire stripping or cutting or pressing or crimping purposes and/or for pressing and securing cable or wire ends together and including a quickly changeable structure for allowing bases or jaws to be easily and quickly changed without fasteners and without driving tools.

2. Description of the Prior Art

Various kinds of typical hand tools have been developed for gripping, pulling, bending, stripping, cutting, crimping, or shearing wires or cables, and comprise a pair of levers pivotally coupled or secured together at a middle portion thereof, and the levers includes one end formed or acted as handles or hand grips for being held and grasped by the users, and the other end having an anvil and/or a cutting tool or crimping tool or other tools attached thereto for conducting the wire or cable gripping, pulling, bending, stripping, cutting, crimping, or shearing operations.

For example, U.S. Pat. No. 3,947,905 to Neff discloses one of the typical multi-purpose electrical wiring tools also comprising a pair of levers pivotally coupled or secured together at a middle portion thereof, and including one end formed or acted as handles or hand grips, and the other end having a number of sharp-edged arcuate recesses on opposing edges.

However, the opposing edges of the other ends of the levers having the sharp-edged arcuate recesses formed and provided thereon are solidly formed and secured to the handles or hand grips of the levers and may not be disengaged from the levers, such that the levers may not be used to operate or treat the wires or cables of different sizes or diameters.

U.S. Pat. No. 4,106,195 to Berg discloses another typical hand tool for cutting and forming aesthetic ends on decorative molding, and comprising an anvil and a cutting tool or crimping tool or other tools attached to the other ends of the levers for conducting the wire or cable cutting, crimping, or shearing operations.

However, the anvil and the cutting or crimping tool are required to be secured to the other ends of the levers with fasteners, such that the fasteners are required to be fastened or threaded or released again and again each time when changing the anvil and/or the cutting or crimping tool. In addition, it may take a long time to fastened or threaded or released the fasteners.

The present invention has arisen to mitigate and/or obviate the afore-described disadvantages of the conventional hand tools.

SUMMARY OF THE INVENTION

The primary objective of the present invention is to provide a hand tool for wire stripping or cutting purposes and/or for pressing and securing cable or wire ends together.

The other objective of the present invention is to provide a hand tool including a quickly changeable structure for allowing bases or jaws to be easily and readily and quickly changed without fastening or releasing fasteners and without driving tools.

In accordance with one aspect of the invention, there is provided a hand tool comprising a first lever and a second lever pivotally coupled together at a middle portion thereof, and each including a first end provided as a handle for being held by users, and each including a second end formed as a carrier end, and each including a channel formed in the carrier end thereof and defined between two plates, a bar engaged into the channel and secured between the plates of each of the first and the second levers, and including a spring-biased projection provided therein, a supporting member including an extension extended therefrom for selectively engaging into the channel of the first lever, and including a slot formed therein for selectively receiving the bar of the first lever, and including a depression formed therein and communicating with the slot of the supporting member for selectively receiving the spring-biased projection of the bar of the first lever, and for anchoring the supporting member to the carrier end of the first lever and for preventing the supporting member from being moved relative to the plates of the first lever, and a tool device including an extension extended therefrom for selectively engaging into the channel of the second lever, and including a slot formed therein for selectively receiving the bar of the second lever, and including a depression formed therein and communicating with the slot of the tool device for selectively receiving the spring-biased projection of the bar of the second lever, and for anchoring the tool device to the carrier end of the second lever and for preventing the tool device from being moved relative to the plates of the second lever.

The plates of the first and the second levers each include an orifice formed therein, and each of the bars include two protrusions engaged into the orifices of the plates of the first and the second levers for attaching the bars to the plates of the first and the second levers.

The orifices of the plates of the first and the second levers include a non-circular cross section, and the protrusions of the bars include a non-circular cross section for engaging into the non-circular orifices of the plates of the first and the second levers and for preventing the bars from being rotated relative to the plates of the first and the second levers.

The extension of the supporting member includes a width smaller than that of the supporting member for forming at least one shoulders therein. The extension of the supporting member includes a serrated surface formed thereon for facilitating a movement of the supporting member relative to the plates of the first lever. The supporting member includes a plurality of notches formed therein for receiving workpieces.

The extension of the tool device includes a width smaller than that of the tool device for forming at least one shoulders therein. The extension of the tool device includes a serrated surface formed thereon for facilitating a movement of the tool device relative to the plates of the second lever.

One or more further supporting members may further be provided and changeably attached to the carrier end of the first lever when the supporting member is disengaged from the carrier end of the first lever. The further supporting members each also include an extension extended therefrom for selectively engaging into the channel of the first lever, and include a slot formed therein for selectively receiving the bar of the first lever, and include a depression formed therein and communicating with the slot of the supporting member for selectively receiving the spring-biased projection of the bar of the first lever, and for anchoring the supporting member to the carrier end of the first lever and for preventing the supporting member from being moved relative to the plates of the first lever.

One or more further tool devices may further be provided and changeably attached to the carrier end of the second lever when the tool device is disengaged from the carrier end of the second lever. The further tool devices each also include an extension extended therefrom for selectively engaging into the channel of the second lever, and include a slot formed therein for selectively receiving the bar of the second lever, and include a depression formed therein and communicating with the slot of the tool device for selectively receiving the spring-biased projection of the bar of the second lever, and for anchoring the tool device to the carrier end of the second lever and for preventing the tool device from being moved relative to the plates of the second lever.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
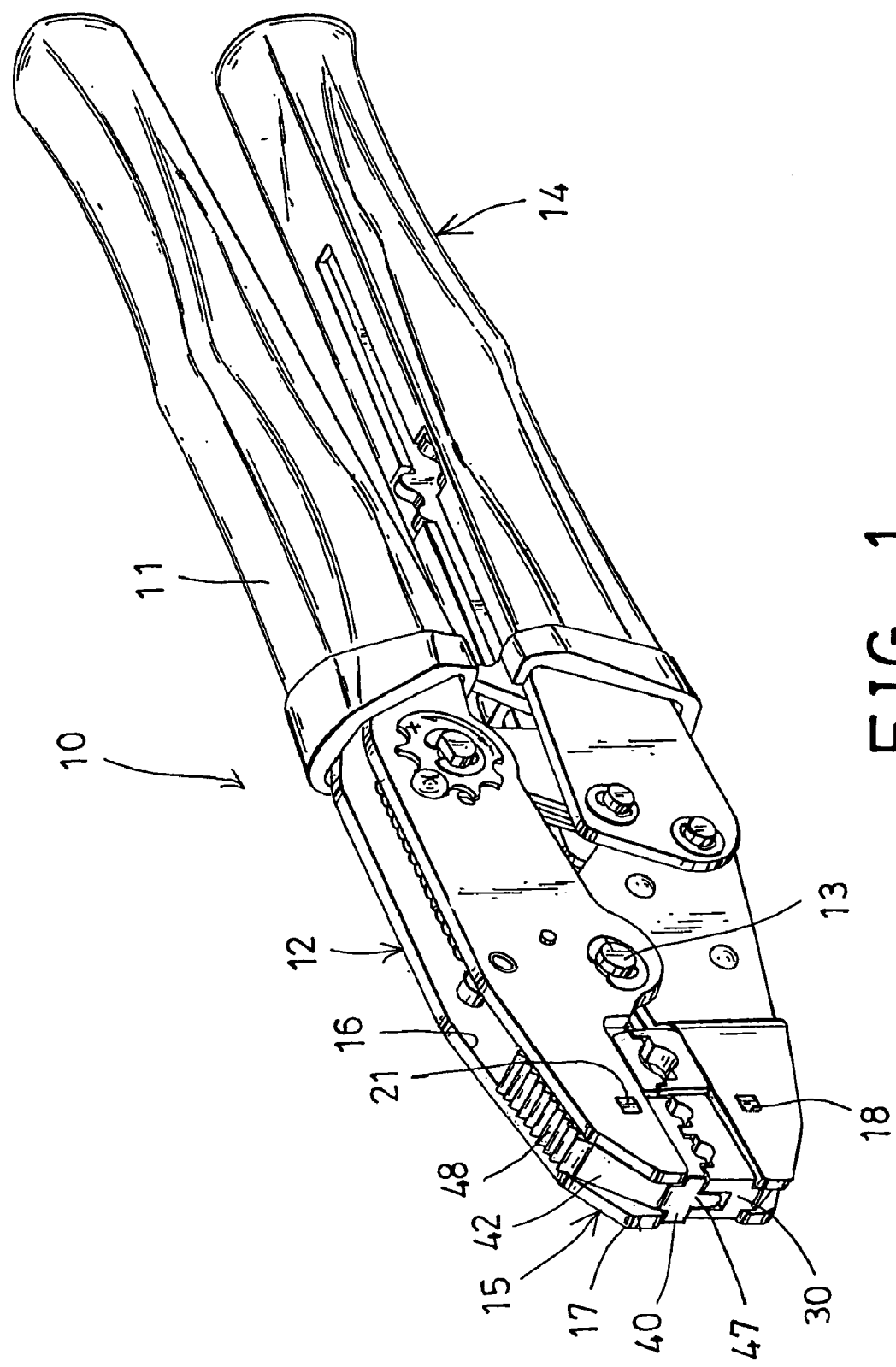
FIG. 1 is a perspective view of a hand tool in accordance with the present invention.

Referring to the drawings, a hand tool 10 in accordance with the present invention comprises a pair of or two levers 11 pivotally coupled or secured together at a middle portion 12 thereof with a pivot axle 13, and the levers 11 include one end 14 provided or formed or acted as hand grips or handles 14 for being held and grasped by the users, and the other or carrier end 15 for conducting the wire or cable gripping, pulling, bending, stripping, cutting, pressing, crimping, or shearing operations. It is preferable that each of the levers 11 include a channel 16 formed in the other or carrier end 15 thereof and defined between two side walls or plates 17.

A bar 20 is to be engaged into the channel 16 of each of the levers 11, and to be attached to or secured between the plates 17. For example, the plates 17 of each of the levers 11 include an orifice 18, such as a non-circular orifice 18 formed therein, and each of the bars 20 include one or two protrusions 21 engaged into the corresponding orifices 18 of the plates 17 of the levers 11 for attaching or securing the bars 20 to the plates 17 of the levers 11 with such as riveting operations or fasteners. Each of the bars 20 include a spring-biased projection 22 disposed or provided therein or extended therefrom for engaging with and for anchoring or positioning the other tool members to the other or carrier end 15 of the levers 11.

Figure 2:
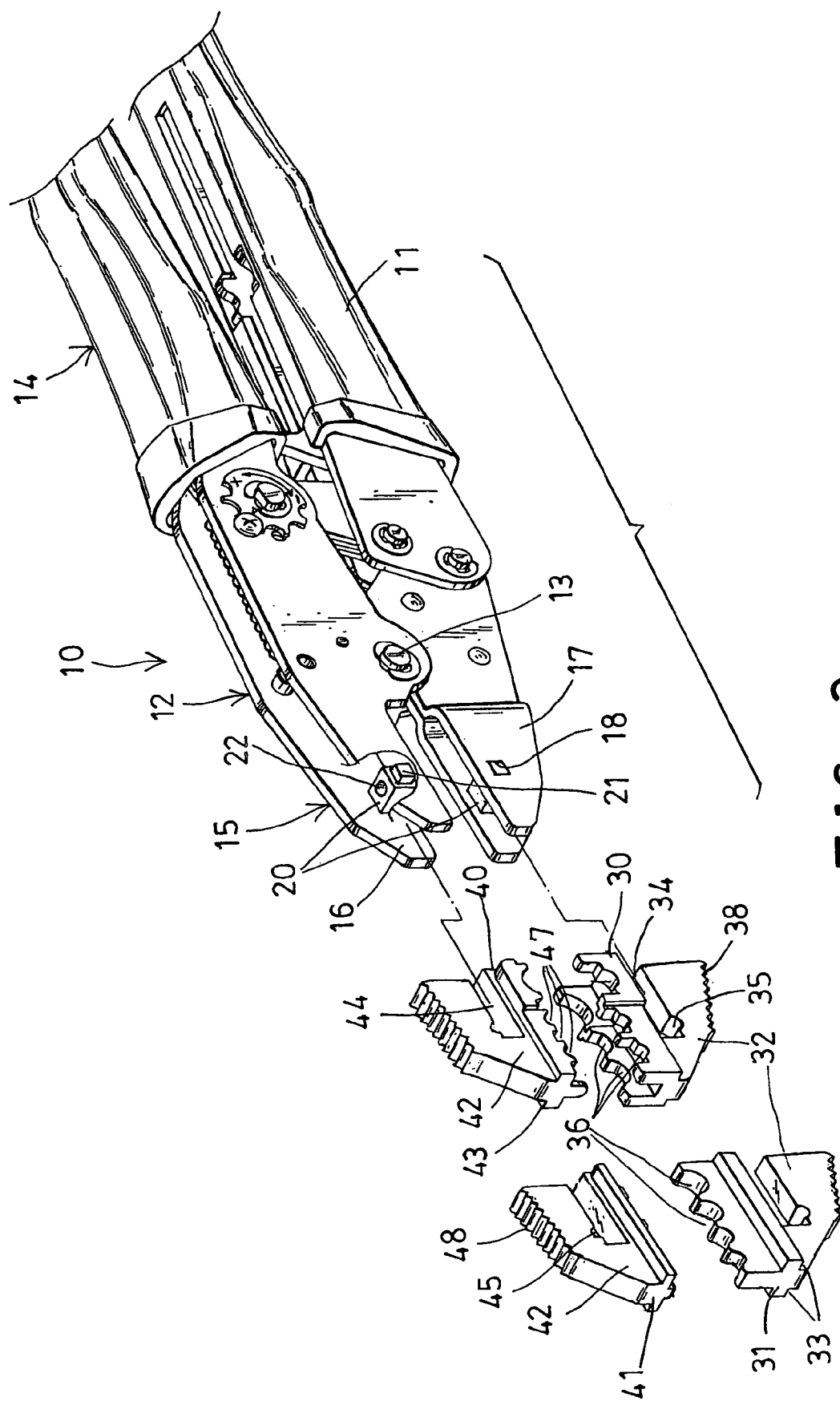
FIG. 2 is a partial exploded view of the hand tool, illustrating the quickly changeable structure of the hand tool.

It is preferable that the protrusions 21 of the bars 20 include a non-circular cross section, such as rectangular, square, or other shapes for engaging into the corresponding non-circular orifices 18 of the plates 17 of the levers 11 and for preventing the bars 20 from being rotated relative to the plates 17 of the levers 11, and thus for retaining or positioning or anchoring the spring-biased projections 22 of the bars 20 at or toward the required or predetermined directions or positions. For example, the spring-biased projection 22 of the upper bar 20 is extended upwardly as shown in FIG. 2, and the spring-biased projection 22 of the lower bar 20 may be extended downwardly, for example.

One or more supporting bases or members or anvils 30, 31 may be selectively or changeably attached to the other or carrier end 15 of one of the levers 11, such as the lower carrier end 15 of the lever 11, when the other supporting members or anvils 30, 31 are disengaged from the carrier end 15 of the lever 11, and each of the supporting members or anvils 30, 31 include a width greater than the width of the channel 16 of the lever 11, for preventing the supporting members or anvils 30, 31 from being engaged into the channel 16 of the lever 11, and for anchoring or positioning the supporting members or anvils 30, 31 to the plates 17 of the lever 11. The anvils 30, 31 each include an extension 32 extended therefrom for selectively or changeably engaging into the channel 16 of the lever 11, and for anchoring or positioning the anvils 30, 31 to the lever 11.

The extensions 32 of the anvils 30, 31 include a width or thickness smaller than that of the anvils 30, 31 for forming or defining one or two side shoulders 33 therein, and the width or thickness of the extensions 32 of the anvils 30, 31 is equals to or smaller or no greater than that of the channel 16 of the lever 11, for allowing the extensions 32 of the anvils 30, 31 to be engaged into the channel 16 of the lever 11, and for stably anchoring or positioning the anvils 30, 31 to the lower carrier end 15 of the lever 11, and/or for preventing the anvils 30, 31 from being moved laterally or sidewise relative to the plates 17 of the lever 11.

The anvils 30, 31 each further include a slot 34 formed therein for selectively receiving the lower bar 20 and for further anchoring or positioning the anvils 30, 31 to the lower carrier end 15 of the lever 11, and/or for preventing the anvils 30, 31 from being moved up and down relative to the plates 17 of the lever 11. The anvils 30, 31 each further include a depression 35 formed therein and communicating with the slot 34 thereof for selectively receiving the spring-biased projection 22 of the lower bar 20 and for further anchoring or positioning the anvils 30, 31 to the lower carrier end 15 of the lever 11, and/or for preventing the anvils 30, 31 from being moved relative to the plates 17 of the lever 11.

One or more tool devices 40, 41 may be selectively or changeably attached to the other or carrier end 15 of the other lever 11, such as the upper carrier end 15 of the lever 11, and each also include a width greater than the width of the channel 16 of the lever 11, for preventing the tool devices 40, 41 from being engaged into the channel 16 of the lever 11, and for anchoring or positioning the tool devices 40, 41 to the plates 17 of the lever 11. The tool devices 40, 41 each also include an extension 42 extended therefrom for selectively or changeably engaging into the channel 16 of the lever 11, and for anchoring or positioning the tool devices 40, 41 to the lever 11.

The extensions 42 of the tool devices 40, 41 include a width or thickness smaller than that of the tool devices 40, 41 for forming or defining one or two side shoulders 43 therein, and the width or thickness of the extensions 42 of the tool devices 40, 41 is equals to or smaller or no greater than that of the channel 16 of the lever 11, for allowing the extensions 42 of the tool devices 40, 41 to be engaged into the channel 16 of the lever 11, and for stably anchoring or positioning the tool devices 40, 41 to the upper carrier end 15 of the lever 11, and/or for preventing the tool devices 40, 41 from being moved laterally or sidewise relative to the plates 17 of the lever 11.

The tool devices 40, 41 each further include a slot 44 formed therein for selectively receiving the upper bar 20 and for further anchoring or positioning the tool devices 40, 41 to the upper carrier end 15 of the lever 11, and/or for preventing the tool devices 40, 41 from being moved up and down relative to the plates 17 of the lever 11. The tool devices 40, 41 each further include a depression 45 formed therein and communicating with the slot 44 thereof for selectively receiving the spring-biased projection 22 of the upper bar 20 and for further anchoring or positioning the tool devices 40, 41 to the upper carrier end 15 of the lever 11, and/or for preventing the tool devices 40, 41 from being moved relative to the plates 17 of the lever 11.

The anvils 30, 31 each further include one or more notches 36 formed in the upper portion thereof and having different or required shapes for receiving the objects or workpieces, such as the cable or wire ends therein, for example. The tool devices 40, 41 each further include one or more tool elements 47 formed or provided in the lower portion thereof and having different or required shapes for moving toward the notches 36 of the anvils 30, 31 and for engaging with the objects or workpieces, such as the cable or wire ends therein, and for such as gripping, pulling, bending, stripping, cutting, pressing, crimping, or shearing the objects or workpieces, or the like.

It is to be noted that the anvils 30, 31 and/or the tool devices 40, 41 may be easily and readily and quickly and selectively or changeably engaged into the channels 16 of the levers 11 and thus attached or anchored or positioned or secured to the carrier ends 15 of the levers 11 with the bars 20 and the spring-biased projections 22 of the bars 20, without fastening or releasing any fasteners, such that the anvils 30, 31 and the tool devices 40, 41 having different notches 36 formed therein and having different tool elements 47 provided therein may be easily and quickly changed with each other. It is further preferable that the anvils 30, 31 and the tool devices 40, 41 each further include a serrated outer surface 38, 48 formed thereon for allowing the anvils 30, 31 and the tool devices 40, 41 to be facilitated to move relative to the plates 17 of the levers 11 and to be disengaged from the spring-biased projections 22 of the bars 20.

Accordingly, the hand tool in accordance with the present invention may be provided for wire stripping or cutting purposes and/or for pressing and securing cable or wire ends together, and includes a quickly changeable structure for allowing bases or jaws to be easily and readily and quickly changed without fastening or releasing fasteners and without driving tools.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A hand tool comprising:
a first lever and a second lever pivotally coupled together at a middle portion thereof, and each including a first end provided as a handle for being held by users, and each including a second end formed as a carrier end, and each including a channel formed in said carrier end thereof and defined between two plates,
a bar engaged into said channel and secured between said plates of each of said first and said second levers, and including a spring-biased projection provided therein,
a supporting member including an extension extended therefrom for selectively engaging into said channel of said first lever, and including a slot formed therein for selectively receiving said bar of said first lever, and including a depression formed therein and communicating with said slot of said supporting member for selectively receiving said spring-biased projection of said bar of said first lever, and for anchoring said supporting member to said carrier end of said first lever and for preventing said supporting member from being moved relative to said plates of said first lever, and
a tool device including an extension extended therefrom for selectively engaging into said channel of said second lever, and including a slot formed therein for selectively receiving said bar of said second lever, and including a depression formed therein and communicating with said slot of said tool device for selectively receiving said spring-biased projection of said bar of said second lever, and for anchoring said tool device to said carrier end of said second lever and for preventing said tool device from being moved relative to said plates of said second lever.

2. The hand tool as claimed in claim 1, wherein said plates of said first and said second levers each include an orifice formed therein, and each of said bars include two protrusions engaged into said orifices of said plates of said first and said second levers for attaching said bars to said plates of said first and said second levers.

3. The hand tool as claimed in claim 2, wherein said orifices of said plates of said first and said second levers include a non-circular cross section, and said protrusions of said bars include a non-circular cross section for engaging into said non-circular orifices of said plates of said first and said second levers and for preventing said bars from being rotated relative to said plates of said first and said second levers.

4. The hand tool as claimed in claim 1, wherein said extension of said supporting member includes a width smaller than that of at least one shoulder on said supporting member.

5. The hand tool as claimed in claim 1, wherein said extension of said supporting member includes a serrated surface formed thereon for facilitating a movement of said supporting member relative to said plates of said first lever.

6. The hand tool as claimed in claim 1, wherein said supporting member includes a plurality of notches formed therein for receiving workpieces.

7. The hand tool as claimed in claim 1, wherein said extension of said tool device includes a width smaller than that of at least one shoulder on said tool device.

8. The hand tool as claimed in claim 1, wherein said extension of said tool device includes a serrated surface formed thereon for facilitating a movement of said tool device relative to said plates of said second lever.

9. The hand tool as claimed in claim 1, wherein at least one supporting member is changeably attached to said carrier end of said first lever when said supporting member is disengaged from said carrier end of said first lever.

10. The hand tool as claimed in claim 9, wherein said at least one supporting member includes an extension extended therefrom for selectively engaging into said channel of said first lever, and includes a slot formed therein for selectively receiving said bar of said first lever, and includes a depression formed therein and communicating with said slot of said at least one supporting member for selectively receiving said spring-biased projection of said bar of said first lever, and for anchoring said at least one supporting member to said carrier end of said first lever and for preventing said at least one supporting member from being moved relative to said plates of said first lever.

11. The hand tool as claimed in claim 1, wherein at least one tool device is changeably attached to said carrier end of said second lever when said tool device is disengaged from said carrier end of said second lever.

12. The hand tool as claimed in claim 11, wherein said at least one tool device includes an extension extended therefrom for selectively engaging into said channel of said second lever, and includes a slot formed therein for selectively receiving said bar of said second lever, and includes a depression formed therein and communicating with said slot of said at least one tool device for selectively receiving said spring-biased projection of said bar of said second lever, and for anchoring said at least one tool device to said carrier end of said second lever and for preventing said at least one tool device from being moved relative to said plates of said second lever.

* * * * *